H. A. HEUPEL.
STOP MEANS FOR GLASS SEPARATING DEVICES.
APPLICATION FILED MAR. 30, 1914.
1,220,632. Patented Mar. 27, 1917.
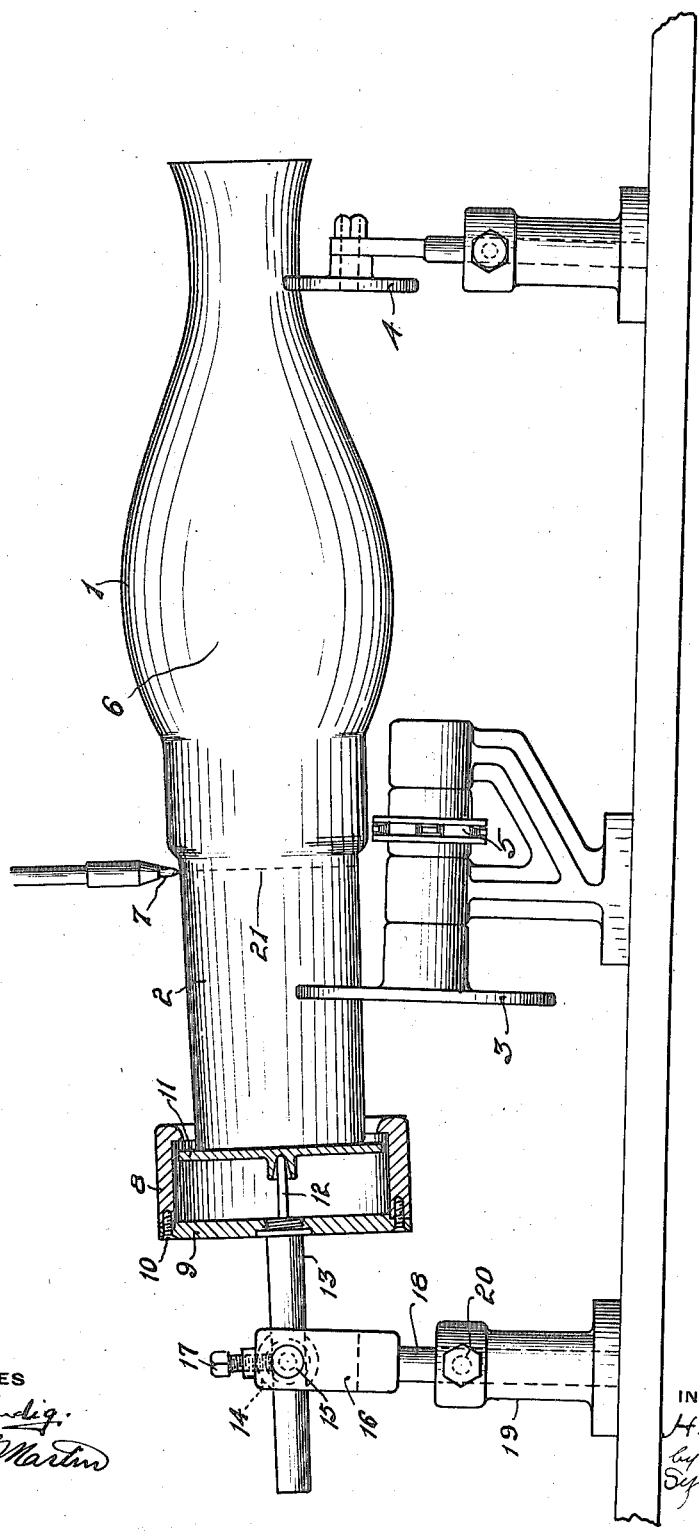

UNITED STATES PATENT OFFICE.

HERMAN A. HEUPEL, OF CHARLEROI, PENNSYLVANIA, ASSIGNOR TO MACBETH-EVANS GLASS COMPANY, OF PITTSBURGH, PENNSYLVANIA, A CORPORATION OF PENNSYLVANIA.

STOP MEANS FOR GLASS-SEPARATING DEVICES.

1,220,632.

Specification of Letters Patent.

Patented Mar. 27, 1917.

Application filed March 30, 1914. Serial No. 828,205.

*To all whom it may concern:*

Be it known that I, HERMAN A. HEUPEL, a citizen of the United States, residing at Charleroi, in the county of Washington and State of Pennsylvania, have invented certain new and useful Improvements in Stop Means for Glass-Separating Devices, of which the following is a specification.

The invention relates to stop means employed in separating glasses from the lamp chimneys with which they are blown. The invention has for its object the provision of a device whereby glasses of uniform height are secured. One embodiment of the invention is illustrated in the accompanying drawing wherein—

The figure is a side elevation of the apparatus with the stop device in section.

In separating glasses from the chimneys with which they were blown, it has been customary to rotate the glass article about its axis, exposing the periphery at the line of desired separation to a gas flame, thus securing a rupture at such line. The position of the bottom if the glass during this operation was determined by a stop bearing against the center of the bottom. As the bottoms of glasses are more or less uneven the length of the glasses cut off by this method varied, depending upon the positions of the central portions of the bottoms of the various glasses as compared with the periphery of the bottoms. In order to remedy this difficulty and secure glasses of substantially the same length I employ a stop plate which engages the periphery of the bottoms of the glasses, such plate being preferably mounted for rotation and for rocking movement to accommodate itself to the positions of the bottoms of the glasses and the axis of movement of the plate lying in the line constituting the axis of rotation of the chimney and glass.

The drawing illustrates a blown glass article in the process of separation, the part marked 1 being the chimney and the part marked 2 being the glass. The article is supported upon two pairs of disks 3 and 4, only one disk of each pair being shown, and the construction in so far as these parts are concerned being well known in the art. The disk 3 is driven from a sprocket 5, thereby securing a rapid rotation of the glass article about its axis 6, while the disks 4 are merely idlers for supporting the end of the chimney and are rotated by virtue of their contact with such chimney. Adjacent the juncture of the chimney and the glass is a gas flame 7 for securing the separation of the chimney from the glass.

Mounted at the left hand end of the apparatus is the stop device comprising the casing members 8 and 9 held together by the screws 10 and the stop plate 11. The stop plate 11 is pivoted at its center for rocking and rotary movement upon the end of the pin 12, such pin 12 being carried by the stem 13 screwed into the casing member 9. The stem 13 passes through a ball 14 pivoted upon a pair of set screws 15 in the fork 16. The ball 14 is provided with a set screw 17 for holding the stem 13 against movement through the ball. This means for supporting a stem for rocking and longitudinal movement is a well known expedient, and no claim is made for such detail of construction. The fork 16 is provided with a stem 18 vertically adjustable in the base 19 and held in any desired position of adjustment by means of the set screw 20.

It will be seen from the foregoing that the stop plate 11 is free to rotate with the bottom of the glass 2, and that by reason of its support for universal movement upon the pin 12 it is free to rock and adjust itself to the bottom of the glass. As a result the line 21 at which the glass is severed is determined and fixed by the bottom of the glass adjacent its outer edge, since the principal portion of the bottom is somewhat depressed and does not touch the plate 11. The glasses as cut off or separated with this apparatus are therefore all substantially of the same height, since the mean distance from the line of contact between the bottom of the glass and the line of cutting off is the same in all cases.

What I claim is:

1. In combination, means for rotating a glass attached to another glass article about their common axis, a separating means adjacent the periphery of the glass, and a stop member for engaging the bottom of the glass on a line remote from its center and having a ball and socket mounting located at the axis of rotation of the glass.

2. In combination, means for rotating a glass attached to a chimney with the axis thereof inclined downward toward the bottom thereof, a device for securing the separation of the glass and chimney located adjacent the juncture of the glass and chimney, and a stop plate mounted for rotation and adapted to engage the bottom of the glass.

3. In combination, means for rotating a glass attached to a chimney with the axis thereof inclined, a device for securing the separation of the glass and chimney located adjacent the juncture of the glass and chimney, and a stop plate mounted for rotation and for universal rocking movement and adapted to engage the bottom of the glass.

4. In combination, means for axially rotating a cylindrical glass article attached to a glass having a bottom extending transversely of the walls of the glass, a separating means adjacent the periphery of the glass and a stop member for engaging the bottom on a line remote from its center, the said member being mounted for rotary and rocking movement.

5. In combination, means for supporting a glass article attached to a glass having a bottom extending transversely of the walls of the glass, a separating means adjacent the periphery of the glass, a stop member for engaging the bottom of the glass on a line remote from its center adapted to be rotated by the glass, and means independent of the stop member for rotating the glass.

In testimony whereof I have hereunto signed my name in the presence of the two subscribed witnesses.

HERMAN A. HEUPEL.

Witnesses:
   THOS. H. WARRENSFORD,
   ROLAND W. BROWN.